Dec. 14, 1954  J. L. DEFFENBAUGH  2,696,803
BIRD FEEDER
Filed Feb. 19, 1953
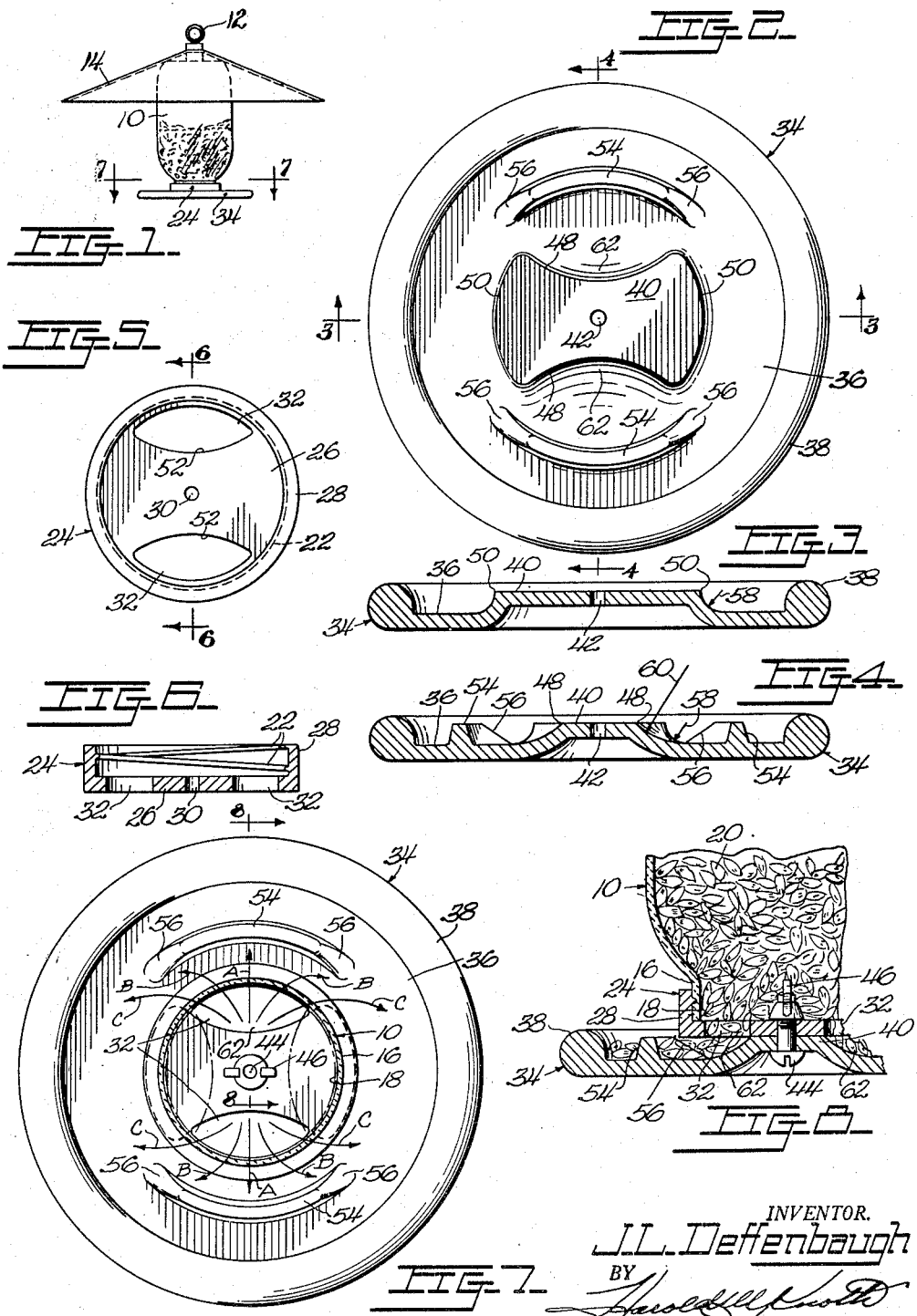
INVENTOR.
J. L. Deffenbaugh
BY
Atty.

United States Patent Office 2,696,803
Patented Dec. 14, 1954

2,696,803

BIRD FEEDER

John L. Deffenbaugh, Moline, Ill.

Application February 19, 1953, Serial No. 337,725

3 Claims. (Cl. 119—52)

This invention relates to a bird feeder of the type comprising a container and distributor hung out of doors for feeding wild birds. More particularly, the invention relates to improvements in the means for distributing the feed.

A typical feeder of the character described may comprise an inverted glass jar to the open mouth of which is affixed a base on which the birds may perch and feed from the material that flows out of the mouth of the container onto the base. One of the problems is to control the flow of feed according to its consumption, so that excess feed does not flow out onto the base and become exposed to the weather. Another problem is presented by variations in the size of seeds or other material that is fed, because some material flows more rapidly than others.

Accordingly the principal object of the invention is to provide an improved distributor incorporating a pair of selectively positionable members for regulating the size of feed openings. A further object is to provide baffle means so related to the openings as to cause the feed to be evenly distributed over the base. In particular, it is an object to so shape the feed openings and the baffle means that the control of distribution is obtainable regardless of the size of seed or other feed used. Another object of the invention is to provide a feeder, and better distributing means therefor, that is simple and economical to manufacture and one that has relatively few movable parts so as to present no particular problems of maintenance.

The foregoing and other important objects and desirable features inherent in and encompassed by the invention will become apparent from the following detailed description and accompanying sheet of drawings in which:

Figure 1 is a view, on a considerably reduced scale, of the complete bird feeder.

Figure 2 is a face view, on a scale enlarged over that of Figure 1, of the base plate.

Figure 3 is a transverse sectional view taken on the line 3—3 of Figure 2.

Figure 4 is a sectional view taken on the line 4—4 of Figure 2.

Figure 5 is a top plan view of the cover that cooperates with the base plate, Figures 2 and 5 being drawn to the same scale.

Figure 6 is a sectional view of the cover as seen along the line 6—6 of Figure 5.

Figure 7 is a horizontal sectional view, on the scale of Figures 2 through 6, as seen along the line 7—7 of Figure 1.

Figure 8 is a fragmentary sectional view as seen along the line 8—8 of Figure 7.

The assembly selected for the purposes of illustration comprises a container that may conventionally take the form of an inverted glass jar 10 appropriately apertured to receive an eye member 12 onto which is assembled a sheet metal conical cover or canopy 14. The bottom (formerly the top) has a conventional neck portion 16 which presents an opening 18 through which the feed, here shown as sunflower seed 20, may flow by gravity. The neck 16 of the jar is externally threaded to receive internal threads 22 on a first member in the form of a circular cover 24. This cover is preferably formed of cast aluminum, because of the several desirable characteristics of that material; although any other appropriate material could be used.

The cover is made up of a radial flange 26 surrounded by a circular peripheral flange 28, within the interior of which the threads 22 are formed. The radial flange is centrally apertured at 30 for a purpose to presently appear. The radial flange also has a pair of oval or almond shaped openings 32, and these are identical in size and shape and are symmetrically arranged at opposite sides of a diameter of the cover. When the cover is screwed onto the neck 16 of the jar, it is positioned horizontally as shown in Figures 1 and 8 and the openings 32 divide the flow of feed 20 into two downwardly and diametrically oppositely directed streams.

Complementing the cover 24 is a second member or base plate 34. This plate is circular and its diameter is materially greater than that of the cover 24. The base plate has a radial upper face 36 surrounded by a circular peripheral or annular perch rib 38, which rib rises from the radial face 36 to present a circular rim. The central portion of the base plate takes the form of an upstanding platform or plateau 40, the upper face of which is at a level above that of the radial face 36 but below that of the top of the base plate as defined by the horizontal plane in which lies the upper surface of the perch rib 38.

The platform 40 is centrally apertured at 42 and the base plate is positioned coaxially with the cover 24 so that the apertures 30 and 42 are in register to receive releasable and pivotal securing means here shown as comprising a bolt 44 and wing nut 46. This means 44—46 serves to interconnect the cover and base plate and, since the nut may be loosened and retightened, provision is made for adjusting the base plate angularly relative to the cover 24.

As best seen in Figure 2, the platform is elongated along one diameter of the base plate and has a pair of opposite long arcuate side edges 48 and a pair of short arcuate end edges 50. The center of the arcs about which the edges 50 are commonly formed is preferably the center of the base plate, which makes the edges 50 convex as compared to the concave long side edges 48, which are respectively formed about centers equally spaced from the center of the plate and lying on a diameter perpendicular or normal to the diameter along which the platform 40 is elongated.

It will be noted from Figure 7 and further from a comparison of Figures 2 and 5 that the edges 48 of the platform 40 are so related to inner arcuate edges 52 of the cover openings 32 that at times the edges will respectively coincide. At such times, the platform 40 offers no restriction to the openings 32 and the openings may accordingly be considered fully exposed, permitting maximum flow of feed out onto the base plate.

In order that the flow of feed via the feed openings 32 may be controlled, the base plate is provided with a pair of means, each in the form of an arcuate baffle rib 54. These ribs are identical and are symmetrically arranged at opposite sides of the long edges 48 of the platform 40. As best shown in Figure 4, each rib 54 rises from the radial face 36 of the base plate to the level of the platform 40. Each rib is in angular extent or length substantially equal to the proximate long side edge 48 of the platform 40, and each is preferably formed concentrically with the base plate, the ribs therefore lying in radially opposed relation to the feed openings 32 in the cover, as best shown in Figures 7 and 8.

Each rib is of upwardly converging shape in section (Figure 4) and additionally has its ends 56 provided with a pronounced taper toward the radial face 36 of the base plate. Stated otherwise, the upper portion of each rib 54 is shorter than its base portion, if measured in a circumferential direction.

The inclined ends 56 merge or fair smoothly into the radial face 36 of the base plate. It will be noted that the zones in which the ends 56 of the ribs 54 merge with the radial face 36 are quite close to the respective junctions of the side and end edges 48 and 50 of the platform 40. Therefore, the pronounced taper of the ends 56 of the ribs 54 eliminates too great a restriction in these zones.

Figure 7 illustrates schematically the general directions taken by the feed as it flows downwardly and then outwardly via the distributing means afforded by the associated cover 24 and base plate 34. The arrows A indicate the generally radial flow of feed outwardly toward center portions of the ribs 54. The arrows B illustrate how some portions of the feed will be turned by the ribs in somewhat circumferential directions, even overflowing the ends 56 of the ribs. The arrows C illustrate how other portions of the feed will be still more circumferentially turned so as to occupy the space between the ends of the ribs 54.

The control of feed flow is further accomplished by the manner in which the side and end edges 48 and 50 of the platform merge with or fair into the radial face 36 of the base plate. As best shown in Figure 3, each arcuate end edge 50 merges with the radial face 36 on a relatively sharp radius designated by the arrow 58. The same arrow 58 appears in Figure 4, wherein it will be seen that each arcuate side edge 48 merges with the radial face 36 on a materially larger radius as indicated by the arrow 60. However, the smaller or sharper radius 58 extends around the corner of each junction between the edges 48 and 50 and the larger radius 60 occurs in a central zone 62 as respects the associated long edge 48, it being understood that the several radii are smoothly blended with each other. The purpose of the arrangement is to provide a longer incline for the feed that flows directly radially outwardly in the directions of the arrows A. It will be observed that the height of each baffle rib 54 is at its maximum in this zone. The sharper or smaller radii 50 occur near the ends of the edges 48, in which zones the ends 56 of the baffle ribs have the pronounced tapers previously described. The flow is so controlled and coordinated that the radial face 36 of the base plate is substantially uniformly filled with feed, for some of the feed flowing in the directions of the arrows C will be reversed by the inner periphery of the perch rib 38 so as to occupy zones radially outwardly of the ribs 54.

As shown in dot-dash lines in Figure 7, the members 24 and 34 may be relatively moved angularly through 90° to dispose the oval openings 32 in the cover respectively over the end portions of the platform 40, whereupon flow of conventional material used in feeders of this type will be cut off. Because of the releasable means 44—46, the angular relation of the base plate 34 to the cover 24 may be selectively adjusted to achieve any desired restriction on the feed openings 32 between the minimum and maximum described.

The base plate 34, like the cover 24, is preferably a simple aluminum casting; although, other appropriate material could be used if desired. Each of the parts is of relatively simple construction, yet is completely effective for the purposes outlined. Various other features of the invention not specifically enumerated herein will undoubtedly occur to those versed in the art, as likewise will numerous modifications and alterations in the preferred embodiment of the invention disclosed.

What is claimed is:

1. In a bird feeder of the character described, in which feed in a container flows by gravity through an opening in the bottom of the container, the improvement comprising: a circular cover positionable in a horizontal plane and adapted to be affixed to the bottom of the container over the opening therein, said cover having therein a pair of openings symmetrically arranged at opposite sides of a diameter of said cover, each of said cover openings being of oval shape and of equal size to divide the flow of feed into two streams; a base plate of circular shape and of a diameter materially greater than that of the cover and positionable coaxially with and below the cover, said plate having an upper face and an annular perch rib rising from said face and further having at its central portion a platform raised above said face and on which the bottom of the cover rests, said platform having opposite arcuate side edges respectively substantially coincident with the arcs of the inner edges of the oval openings of the cover and further having opposite arcuate end edges respectively substantially coincident with the arcs of the outer edges of said cover; releasable means interconnecting the cover and the base plate and providing for relative angular movement between the two about their common axis to provide for regulation of the feed-flow-controlling capacities of the oval openings in the cover by selective angular positioning of the base platform; and said base plate having a pair of arcuate baffle ribs upstanding therefrom respectively intermediate the side edges of the platform and the perch rib and radially outwardly of the periphery of the cover, each baffle rib being arcuate substantially about the center of the base plate and having opposite terminal end portions spaced apart angularly to give the baffle rib an angular length on the order of the proximate arcuate side edge of the platform and effective to turn feed generally transversely to the radial direction that such feed flows through the cover openings and past the platform each terminal end portion of each baffle rib being spaced a substantial angular distance from the corresponding terminal end portion of the other baffle rib to provide a pair of diametrically opposed areas on the face over and onto which the feed flows radially outwardly when turned generally transversely as aforesaid by the baffle ribs.

2. The invention defined in claim 1, in which: each arcuate end edge of the platform merges downwardly and outwardly with the upper face of the base about a relatively small radius; and each arcuate side edge of the platform merges with the platform about radii gradually increasing from said relatively small radius at the end of the platform to a materially greater radius at the center of the platform; said platform being symmetrical at opposite sides of a diameter of the base plate and further being symmetrical at opposite sides of a second diameter normal to the aforesaid diameter.

3. The invention defined in claim 1, in which: each end of each baffle rib merges gradually into the upper face of the base plate in a circumferential direction generally as an extension of the arc on which said rib is formed.

References Cited in the file of this patent

UNITED STATES PATENTS

| Number | Name | Date |
|---|---|---|
| 1,228,929 | Johnson | June 5, 1917 |
| 1,801,932 | Miller | Apr. 21, 1931 |
| 1,815,964 | Boyer | July 28, 1931 |
| 2,371,617 | Halverson | Mar. 20, 1945 |

FOREIGN PATENTS

| Number | Country | Date |
|---|---|---|
| 347,487 | Great Britain | Apr. 30, 1931 |